Sept. 6, 1955 C. A. SHOUP 2,717,190
CATHODE-RAY TUBE ANALYZER AND RESTORER
Filed Oct. 13, 1954 2 Sheets-Sheet 1
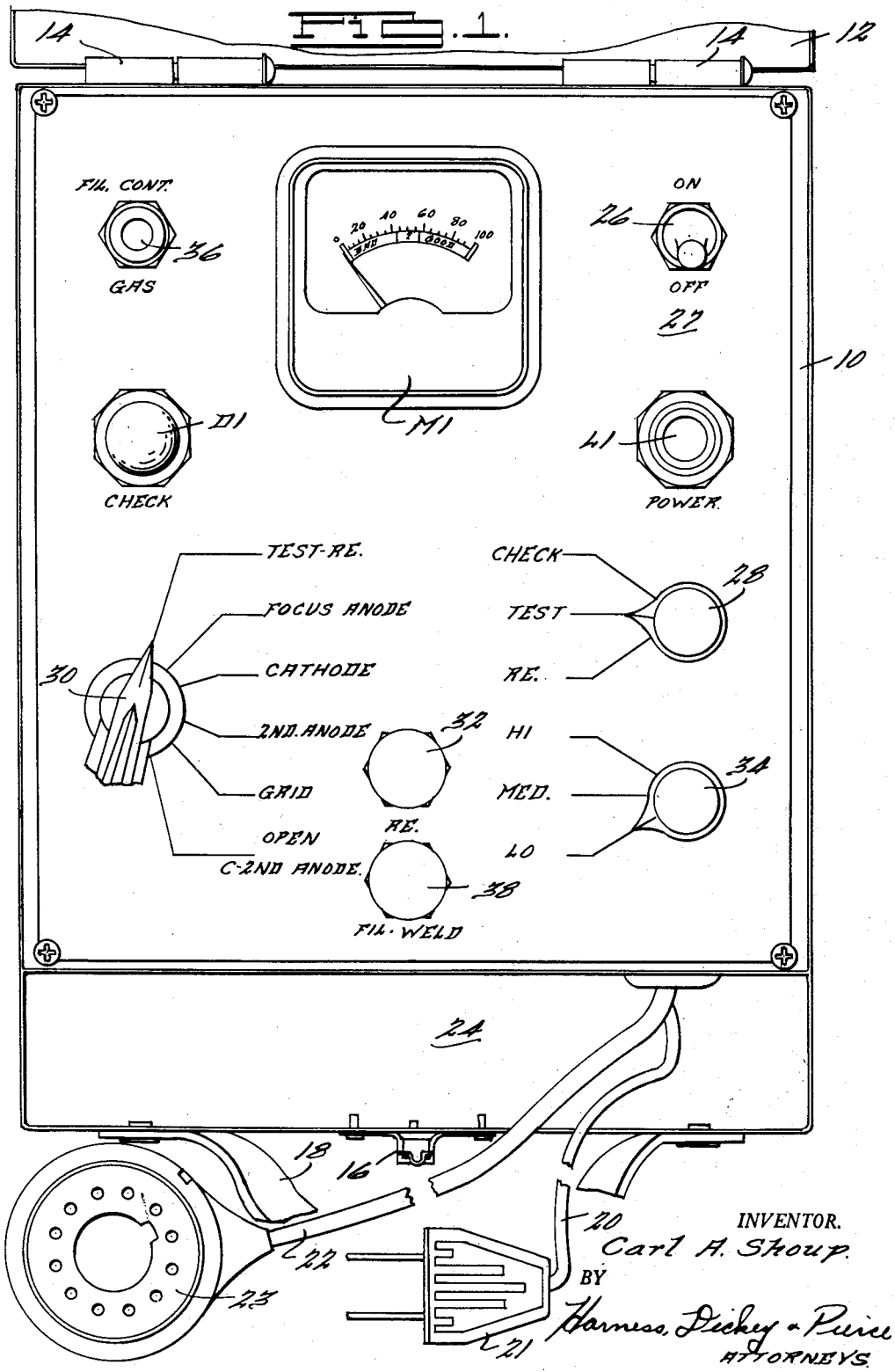
INVENTOR.
Carl A. Shoup.
BY
Harness, Dickey & Pierce
ATTORNEYS

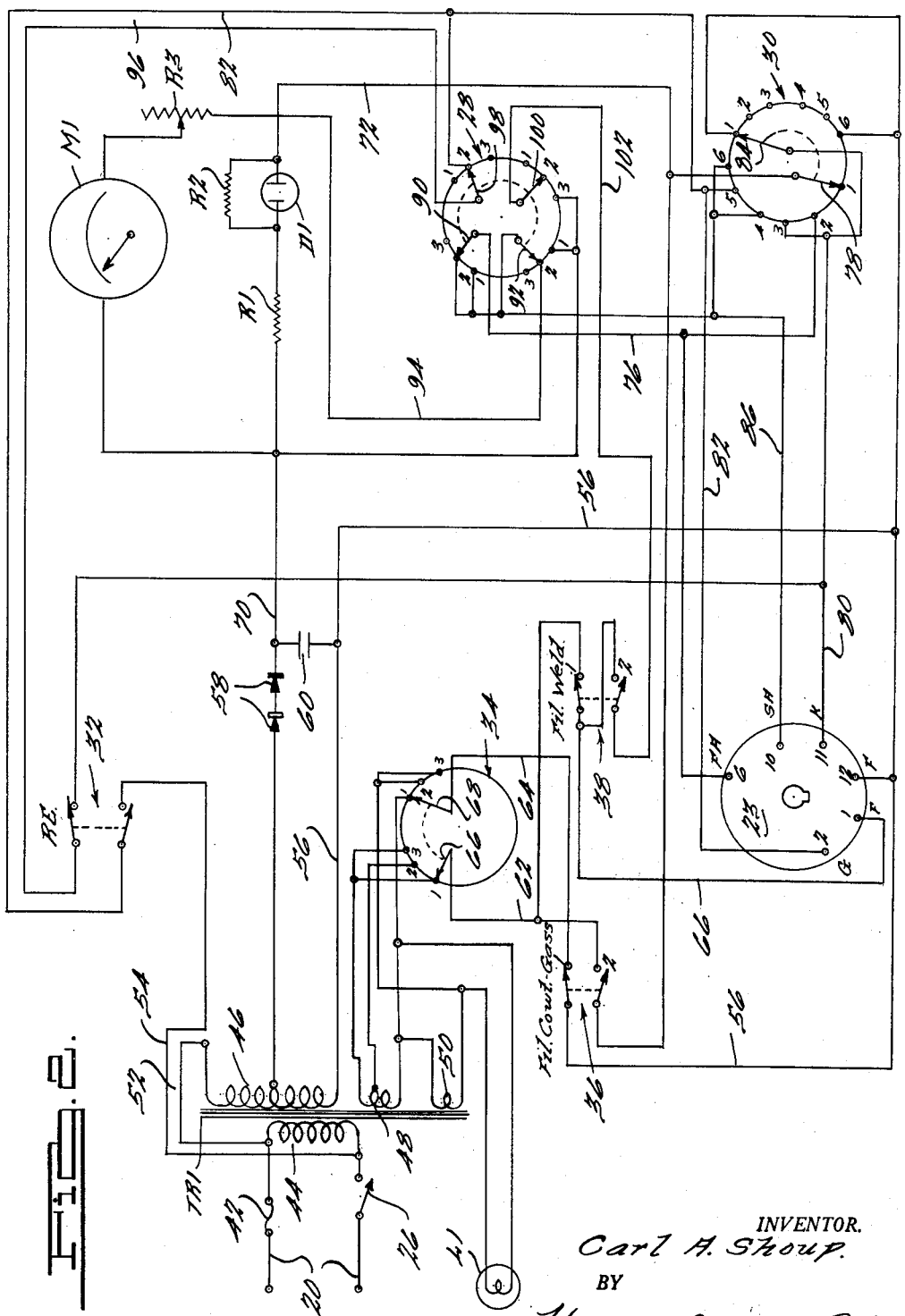

United States Patent Office 2,717,190
Patented Sept. 6, 1955

2,717,190

CATHODE-RAY TUBE ANALYZER AND RESTORER

Carl A. Shoup, Detroit, Mich., assignor to Thomas A. Demetry, Detroit, Mich.

Application October 13, 1954, Serial No. 462,020

12 Claims. (Cl. 316—2)

This invention relates to testing and repairing devices, and more particularly, to devices for testing and improving the condition of electron-discharge devices.

The object of this invention is to determine the electrical condition of electron-discharge devices and to improve the operating characteristics of aged or defective electron-discharge devices.

A feature of this invention is an improved means for determining the condition of the filament of an electron-discharge device.

Another feature of this invention is a means for repairing ruptured electron-discharge device filaments.

Another feature of this invention is an improved means for determining whether any one of a plurality of elements in an electron-discharge device is improperly electrically connected to any other of that plurality of elements and for ascertaining whether the electrical leakage between any of those elements exceeds a preselected medium value.

A further feature of this invention is an improved means for determining whether any of selected ones of the electrodes in an electron discharge device are electrically open.

A further feature of this invention is an improved means for determining the operative quality of an electron-discharge device.

Another feature of this invention is an improved means for establishing a momentary condition in an electron-discharge device for renewing or restoring that device to a satisfactory operating condition.

Another feature of this invention is an improved means for establishing an electrical condition in an electron-discharge device of a controlled degree of abnormality for that device.

Another feature of this invention is an improved means for detecting the presence of an ionizable medium in an ostensibly evacuated envelope.

The manner of attainment of the foregoing object and features, and other objects and features of the invention, will be apparent from consideration of the following detailed description of one embodiment of the invention when read with reference to the accompanying drawings in which:

Figure 1 is a front elevational view of a testing and renewing device embodying the principles of the invention, shown in a carrying case, a portion of the carrying case being cut away; and Fig. 2 is a schematic representation of the circuitry within the device shown in Fig. 1.

Certain features of the testing means disclosed herein are also present in the tester disclosed in my copending application Serial No. 462,047, filed on even date herewith.

The instrument constituting the preferred embodiment of the invention is mounted in a carrying case 10 provided with a lid 12 (substantially entirely cut away) pivotally mounted to the case 10 by means of hinges 14, and adapted, upon closure, to be retained in position by means of a latch 16. A carrying handle 18 is or may be provided. A pair of insulated conductors 20 terminate in a plug 21 adapted to be associated with a conventional domestic power supply. An extended cable 22 terminates in a socket 23 which is exemplarily shown to be of a type adapted to accept substantially any of the presently commercially available television cathode-ray or picture tubes, although it is to be understood that any appropriate type of socket may be employed to permit association of the instrument with any other suitable type of electron-discharge device for testing and/or renewing that device in a manner hereinafter to be taught.

Both the plug 21, with its cord 20, and the socket 23, with its cord 22, are accepted by a cavity 24 in the carrying case 10 to facilitate transportation of the equipment.

With the plug 21 connected to an appropriate outlet, the internal circuitry may be energized by operating switch 26 mounted upon the front panel 27 of the instrument. This switch also energizes light L1, mounted on the front panel 27, to serve as an indication that the equipment is prepared for operation.

The face of the instrument also bears two indicating instrumentalities: a "check" lamp D1, which, as will be seen, preferably comprises a gaseous-discharge device such as a neon diode, and a meter M1 which is preferably an ammeter. The "check" lamp D1 serves, in a fashion hereinafter to be described, to indicate certain selected internal impedance conditions in the electron-discharge device under test. The meter M1 serves as an indicator of the operational quality of the device under test, and, akin to conventional tube testers, is shown to be provided with scale indications as to the acceptable, unacceptable or questionable nature of the device being tested. Meter M1 may also be provided with a calibrated scale which may be either in significant or arbitrary units.

Circuit means, hereinafter to be described, are provided for testing the operational characteristics of a cathode-ray tube, the results of such testing being displayed upon the meter M1, for checking selected internal impedance conditions in the cathode-ray tube, the results of such testing being displayed upon the "check" lamp D1, and for renewing or renovating the cathode-ray tube if the aforesaid testing and checking indicates that such is required.

The selection of which of these operations is to be performed is primarily controlled by a function switch 28 and a selector switch 30. The function switch 28, as will be seen, is a three-postion four-pole switch of the bandswitching type, the three positions of which are marked on the panel 27 as "RE.", connoting "renew," "renovate," or other corresponding appellation, a "Test" position and a "Check" position. The selector switch 30 is a two-pole, six-position switch, the first or "Test-RE." position of which is employed when either the testing or renewing operation is being performed. With the function switch 28 turned to the "check" position preparatory to an investigation of the internal impedance conditions in the cathode-ray or picture tube under test, selector switch 30 is employed to switch among selected ones of the tube electrodes not only to permit the ascertainment of the impedance conditions involving the selected electrode but also to permit the detection of certain types of defects that commonly occur in cathode-ray tubes.

In order to renew or renovate the device, if the tests indicate that to be necessary, the function switch 28 and the selector switch 30 are both returned to their first positions, and the "RE" button 32 is momentarily depressed to complete a circuit hereinafter to be described.

The instrument is preferably provided with an internal power supply designed to provide a filament voltage for the electron-discharge device under test, the general amplitude of that voltage being selectable by means of a filament switch 34. The continuity of the filament in the device under test is checked by means of a "Fil. Cont." button 36 employed in conjunction with "check" lamp D1, switch 36 also serving, in conjunction with the meter M1, effectively to measure the degree to which an ionizable medium is present in the picture tube under investigation.

Switch 38, labeled "Fil. Weld" on panel 27, permits an attempt to be made to establish continuity in an otherwise open filament in the device under test.

In the circuit of Fig. 2, those elements which appear, or control knobs for which appear, on the front panel of the instrument shown in Fig. 1 of the drawings, are correspondingly referenced. Assuming the conductors 20 to be connected to a suitable source of alternating-voltage, e. g., 110 to 120 volts, upon the closure of the on-off switch 26, alternating current is applied through fuse 42 to the primary winding 44 of power transformer TR1. Transformer TR1 is exemplarily shown to be provided with three secondary windings, 46, 48 and 50. Center tapped secondary 46 may be assumed to be wound to provide 250 volts either side of center with normal line voltages applied to the primary. Since one end of the secondary winding 46 is connected to one end of the primary winding 44 by means of conductor 52, those windings being connected in series-aiding relationship, windings 44 and 46 cooperate to form an auto-transformer with approximately 600 volts A. C. being available between conductor 54, connected to the opposite end of winding 44 from conductor 52, and conductor 56, connected to the opposite end of winding 46 from conductor 52.

The alternating voltage appearing across the lower half of the secondary winding 46 is rectified by rectifiers 58, representatively shown as being of the dry disc type, producing across filter capacitor 60, and hence between conductors 70 and 56, a direct voltage, resulting from the half-wave rectification, of approximately 350 volts.

It is assumed that the normal filament voltage for the picture tube under test is 6.3 volts A. C. Secondary winding 48 may be assumed to be a center tapped 6.3-volt winding and secondary 50 may be assumed to be a 5-volt winding. The filament switch 34 may be employed to establish between conductors 62 and 64 any selected one of three filament voltages. Switch 34 is a commercially available type of three-pole two-position bandswitch provided with a pair of wipers 66 and 68 mechanically interconnected but electrically individual. When switch 34 is in its No. 1 position, wipers 66 and 68 engage their No. 1 contacts so as to connect conductors 62 and 64 across the entire 6.3-volt secondary winding 48. Thus, in its No. 1 position, switch 34 applies to conductors 62 and 64 an alternating voltage labeled "Lo" on the face of the panel. In the No. 2 or "Med." position of filament switch 34, conductors 62 and 64 are connected across the 5-volt winding 50 and one half of the 6.3-volt winding 48, those windings being so polarized that a voltage slightly greater than 8 volts A. C. appears between conductors 62 and 64. The 5-volt winding 50 and the full 6.3-volt winding 48 are connected in series-aiding relationship across conductors 62 and 64 when switch 34 is in its No. 3 position, producing the labeled "Hi" filament voltage.

It is to be understood that the shown power supply is but representative and may be modified in any of the number of ways. Thus, if secondary winding 46 is capable of developing 350 volts A. C. either side of center tap with customary line voltages being applied to the primary winding 44, then a voltage appropriate for the purposes hereinafter to be described will be available between conductors 52 and 56 so that the primary winding 44 and the secondary winding 46 need not be connected as an auto transformer to produce that voltage. Similarly, if the transformer is provided with a secondary winding tapped to develop approximating 6 volts, 8 volts, and 11 volts, then a single-pole three-position switch may be employed in lieu of the disclosed switch 34. Since the disclosed device is primarily applicable, in its preferred form, to the testing of cathode-ray tubes appearing in television receivers, the appropriate alternating and direct voltages may possibly be obtained from the television chassis containing the picture tube under test, obviating the necessity for an internal power supply in this testing device. However, it is obvious that the provision of an internal power supply of the nature shown or of an alternative form is preferable.

The operation of the elements of the circuit of Fig. 2 will be described in the order of the preferred operational sequence of the equipment. The several switches, with the exception of switch 26, are shown in the positions in which they should be placed prior to the time that the equipment is associated with the picture tube to be tested. The filament switch 34 is normally positioned in engagement with its No. 1 contact, as shown. The function switch 28, a four-pole three-position band switching type, is initially placed in its No. 2 "test" position, and the selector switch 30, a six-position two-pole band switching type, is initially placed in its No. 1 "Test-RE." position. Switches 32, 36 and 38 are all two-pole two-position switches in which the moving elements are mechanically interconnected but in which those moving elements are alternatively in contact with their mating fixed contact elements. Thus, switch 32, in its released position, has an upper No. 1 contact which is closed and a lower No. 2 contact which is open; when the switch is operated, the No. 1 contacts are opened and the No. 2 contacts are closed. Switches 36 and 38 operate similarly.

With the switches in the above-described condition, but with the on-off switch 26 operated, the socket 23 is associated with the base of the television picture tube to be tested. For exemplary purposes, the basing of the television tube, customary as of the date of this application, is assumed to be such that the tube filament is connected between the No. 1 and No. 12 base pins, the grid is connected to the No. 2 base pin, the focusing anode is connected to the No. 6 pin, the second anode is connected to the No. 10 pin, and the cathode is connected to the No. 11 pin of the tube base. Since the No. 1 pin of the tube is connected via conductor 66 and the No. 1 contact of the filament weld switch 38 to conductor 62, since the No. 12 pin of the picture tube is connected via conductor 56 and the No. 1 contact of the filament continuity switch 36 to conductor 64, and since the filament switch 34 is in its No. 1 position, an appropriate alternating voltage will be applied to the tube filament to cause the tube to become appropriately heated preparatory to the testing operation, assuming that filament not to be open.

The continuity of the filament in the picture tube may be checked by depression the filament continuity switch 36. Closure of the switch 36 completes a circuit from the positive direct potential appearing upon conductor 70, through resistor R1, neon diode D1 shunted by resistor R2, conductor 72, the No. 2 contact of the filament continuity switch 36, No. 1 contact of the filament weld switch 38, conductor 66, through the picture tube filament from the No. 1 to the No. 12 pins of the base of the picture tube, and to conductor 56 which is the negative return of the direct voltage supply. If the filament is open, obviously no current will flow and diode D1 will produce no illumination. However, the parameters are so selected that if the filament is continuous, presenting a relatively low resistance between the pins 1 and and 12 of socket 23, diode D1 will glow to indicate that the filament is in satisfactory operating condition.

The next operation in the preferred sequence is to check the internal impedance conditions of the tube. It has been found that apart from low cathode omission, the primary cause of defects in television picture tubes is the existence of a short or a relatively low-impedance path between the picture tube filament and one or more of the other electrodes in the tube. The resistance between the filament and each of the other electrodes is therefore checked by means including the neon diode D1. A series circuit is established including the filament of the picture tube, a selected one of the other electrodes of the picture tube, a source of direct potential, and the neon diode D1 with its associated resistors R1 and R2. Since the picture tube will tend to operate improperly even if the leakage between the filament and any one of the other electrodes is relatively small, a high sensitivity circuit has been developed. Thus, with the parameters employed in practical embodiments of the invention, the neon diode D1 will glow perceptibly if the resistance between the filament and any selected other electrode of the tube is 15 megohms or less.

The several pertinent electrodes of the television tube are sequentially connected in the aforesaid series resistance-measuring circuit by means of the selector switch 30. With the system energized by the closing of switch 26, and with switches 32, 34, 36 and 38 remaining in the position shown, the function switch 28 is shifted to its No. 3, "check" position, and the selector switch 30 is then traversed between its No. 2 and No. 5 positions.

In the No. 2 position of the selector switch 30, the resistance between the focusing anode and the filament is measured. Thus, a connection is established from the No. 6 terminal of socket 23, conductor 76, the No. 2 contact and wiper 78 of the selector switch 30, conductor 72, neon diode D1 shunted by resistor R2, resistor R1, conductor 70 and to the positive direct voltage appearing across capacitor 60, the negative return lead 56 of which is connected to the No. 12 terminal of socket 23 and hence to the filament, which is energized as above described. As a consequence, a series circuit is established including a positive potential, the diode D1, and the focusing anode and filament of the tube under test. If there is a complete short between the focusing anode and the filament, the neon diode D1 will glow very brightly. If the leakage current between the focusing anode and the filament is such as would be produced by the substitution of a 15 megohm resistor between terminals 6 and 12 of the socket 23 then the diode D1 will perceptibly glow. The degree of illumination produced by the diode D1 for intermediate values of leakage is approximately proportional to the amount of that leakage.

When the selector switch 30 is switched to the No. 3 position, the resistance is measured between the filament and the cathode. The cathode, appearing at the No. 11 terminal of socket 23, is connected in a series circuit including the No. 3 contact and wiper 78 of the selector switch 30, the conductor 72, diode D1 shunted by resistor R2, resistor R1, and to the positive direct potential appearing on conductor 70, the negative return lead 56 of which is again connected to the filament. Again, the intensity of the glow in the neon diode D1 is approximately proportional to the amount of leakage between the tested elements, an absence of illumination from the diode D1 again indicated that the device under test is operationally satisfactory from this standpoint.

In the No. 4 position of switch 30, the second anode, appearing at the No. 10 terminal of socket 23, is connected via conductor 86, No. 4 contact and wiper 78 of switch 30, conductor 72, diode D1 shunted by resistor R2, resistor R1, and to the positive potential on conductor 70. Consequently, any shorted or leaky condition between the second anode and filament is detected.

In the No. 5 position of switch 30, the grid, appearing at the No. 2 terminal of socket 23, is connected via conductor 82, No. 5 contact and wiper 78 of switch 30, conductor 72, diode D1 and its shunting resistor R2, resistor R1 and to the positive potential on conductor 70 so that the resistance between the grid and the filament is indicated.

Another common cause for malfunctioning in television picture tubes is an open cathode or an open grid. Testing of this condition is accomplished by moving selector switch 30 to its No. 6 position. In this position, as in the others, the tube filament is energized and connected to the negative return lead 56. The cathode is connected via conductor 80, through wiper 84 and the No. 6 contact of selector switch 30 to the negative return lead 56. The second anode, connected to the No. 10 terminal of socket 23, is connected via conductor 86, No. 6 contact and wiper 78 of the selector switch 30, conductor 72, diode D1 shunted by resistor R2, resistor R1, and to the positive direct potential on conductor 70. Therefore, a direct voltage is applied to a series circuit including the neon diode and the electron-discharge path between the second anode and the cathode of the picture tube under test. The parameters are so selected that if the second anode and cathode are both in proper operative condition, the diode D1 will glow with an intensity about half between no glow and full glow. If either the second anode or the cathode is open, however, or if the cathode emission is exceedingly low, the neon diode D1 will not visibly glow.

While as a practical matter it is of little significance whether it is the cathode or the second anode which is defective, as detected by this test, an indication as to which of these elements is inoperative may be obtained by switching the filament switch 34 to its No. 2 or medium position which, it will be recalled, increases the filament voltage in the tube to an abnormally high value. If the second anode is defective, this change in filament potential should produce no detectable change in the condition of the diode D1. However, it has been found that if the cathode is weak or open, upon the application of the higher filament voltage, a slight glow will frequently be perceived in the diode D1, serving as an indication that the defective electrode is the cathode rather than the second anode.

The next investigation in the operational sequence is preferably to test the quality of the operation of the tube, assuming that such a check is possible as determined by the foregoing tests, i. e., that the filament and the other electrodes in the envelope are in operative condition. This is accomplished by setting the function switch 28 in its No. 2 "Test" position, and setting the selector switch 30 in its No. 1 "Test-RE." position. By so doing, the focusing anode, connected to the No. 6 terminal of socket 23, is connected to the second anode, connected to the No. 10 terminal of socket 23, over a path including conductor 76, wiper 90 and the No. 2 contact of the function switch 28, and conductor 86. Both the focusing anode and the second anode are connected to the positive direct voltage appearing on conductor 70 over a path including conductor 86, wiper 92 and the No. 2 contact of function switch 28, conductor 94, variable resistor R3, and through the milliameter M1. Additionally, the cathode, connected to the No. 11 terminal of socket 23, is connected to the grid, connected to the No. 2 terminal of socket 23, over a path including conductor 80, the No. 1 contact of switch 32, wiper 98 and No. 2 contact of switch 28 and conductor 82. Both the cathode and the grid are connected to the negative return lead 56 through the wiper 84 and No. 1 contact of the selector switch 30. The amount of current flowing through this series circuit, and hence the deflection of the milliameter M1, is a measure of the operational condition of the tube under test. The result of this test is displayed upon the face of the meter M1, as shown in Fig. 1 of the drawings.

Assuming the filament to be continuous and operative, means are provided for restoring it to good operative condition if any of the electrodes in the tube under test are shorted together, if there is excessive leakage between any pair of those electrodes, or if the quality of the tube is low as determined by the reading on the meter M1. To accomplish this operation, the function switch 28 is switched to its No. 1 position, the element selector switch 30 is placed in its No. 1 position, and the "RE." switch 32 is momentarily operated. In momentarily operating switch 32, its No. 1 contact is momentarily opened and its No. 2 contact is momentarily closed. A simple push button type switch may be employed, in which case reliance is placed upon the operator that the operation be momentary. Alternatively, a switch may be employed which automatically creates a momentary opening of the No. 1 contact and a momentary closing of No. 2 contact after which the switch automatically restores to normal position whether the operator has released the button or not. During the period of momentary operation of switch 32, wherein the No. 1 contact is momentarily opened and the No. 2 contact is momentarily closed, the focusing anode, at the No. 6 terminal of socket 23, is connected to the second anode, at the No. 10 terminal of socket 23, over a path including conductor 76, wiper 90 and the No. 1 contact of function switch 28, and conductor 86. Both the focusing anode and the second anode are connected to the positive direct voltage appearing on conductor 70 over a path including conductor 86, wiper 92 and the No. 1 contact of function switch 28. The cathode of the device under test, appearing at the No. 11 terminal of socket 23, is connected via wiper 84 and the No. 1 contact of switch 30 to the negative return lead 56, which is connected to the lower end of the secondary winding 46 of the transformer TR1. The control grid, appearing at the No. 2 terminal of socket 23, is connected via conductor 82 and the momentarily closed No. 2 contact of switch 32 to conductor 54. It will be recalled that transformer TR1 is connected as an autotransformer in the disclosed embodiment of the invention so that an alternating voltage in the order of 600 volts appears between conductors 54 and 56. This alternating voltage, by virtue of the above-described connections, is applied between the cathode and grid of the device under test. As before noted, a direct voltage is applied between the cathode and the combination of the focusing anode and the second anode. The filament continues to be energized with normal filament voltage. This relatively extreme overloaded condition of the picture tube under test persists only momentarily. It has been found in practice, however that the described treatment produces, with very few exceptions, a substantial improvement in the performance of the device being renewed. Open elements tend to become welded, shorts tend to become relieved, and leakage tends to be reduced. The effect upon the tube electrodes is not fully understood, but it is believed that excessive leakage and shorts are relieved by a physical distortion of the elements which occurs as a result of the momentary severe overload, and that open electrodes are rendered continuous as a result of a welding operation. The improvement in the operating characteristics of the picture tube so treated is believed to accrue from the fact that impurities, such as oxides, existing in or on the emissive coating as a result of extensive use of the tube are removed or dissipated as a result of the voltages applied by this test instrument. In any event, of a large number of picture tubes treated which had continuous filaments but which were otherwise inoperative or operationally unsatisfactory due to opens, shorts, leakage or low cathode emission, a very large percentage were restored to a serviceable condition and remained in that serviceable condition for a period approaching that which might be expected of a new replacement picture tube.

The results of the renewing operation may be tested by restoring the picture tube to service in the television receive and viewing the image. However, it is advantageous to again employ the short, leakage or open tests and to again measure the quality of the tube on the meter M1.

If the condition of the tube is not substantially improved, the switch 32 should again be momentarily depressed, and the condition of the tube again checked. If this second treatment does not substantially improve the tube, the filament switch 34 should be switched to its No. 2 position wherein the voltage applied to the filament is increased to a "medium" value. Switch 32 is again momentarily depressed, and the filament switch 34 is then restored to its No. 1 position preparatory to testing the condition of the picture tube. If this operation still fails to produce a substantial improvement in the performance of the tube, switch 34 is turned to its No. 3 position wherein a substantially higher voltage is applied to the filaments and the renewing operation repeated by momentarily operating switch 32. If, after switch 34 is restored to its No. 1 position, the tube still does not appear to be satisfactory, it should then be discarded as being incapable of repair. However, as before noted, but few tubes require such ultimate disposition when treated in the manner described.

It is to be understood that the particular voltages applied to the tube being renewed are but exemplary. It has been found that with the use of normal filament voltages or voltages slightly elevated thereabove, a direct voltage between the anode and cathode in the order of 350 volts, and an alternating voltage between the cathode and the grid of the order of 600 to 700 volts produces excellent results. Reasonably satisfactory results can be obtained with the application of lower alternating-voltage signals, e. g. 300 volts, between the cathode and grid, particularly if the filament voltage is slightly elevated or the direct voltage between the anodes and the cathode is higher than the noted value. Similarly, higher alternating voltages e. g., 900 volts, may be applied between the cathode and grid, although to prevent damage to the device being treated, it is then advisable to reduce the direct voltage between the anodes and the cathode and, in some cases, to reduce the filament voltage.

Even though the picture tube which is being investigated is otherwise in satisfactory operating condition, either initially as determined by the foregoing tests or as the result of the above-described renewing operations, as is well known in the art, immediate and continued satisfactory performance cannot be expected if there is excessive secondary emission in the device, resulting from the presence of an excessive quantity of an ionizable medium in the ostensibly evacuated envelope. Therefore, preferably upon the completion of all of the foregoing operations, the function switch 28 is restored to its No. 2 position, the selector switch 30 is placed in its No. 1 position and the filament switch 34 is placed in its No. 1 position. As a result, the meter M1 will be deflected to present an indication of the operational quality of the device, as before described. The position of the meter needle is noted. Switch 36 is then operated to disconnect conductor 64 from conductor 56, thereby de-energizing the filament in the device being investigated. It will be recalled from the foregoing description of the filament continuity test that depression of switch 34 also completes a circuit including the filament of the device under test, the diode D1 and a source of direct potential. The current flowing in that circuit, however, is of such a magnitude as to produce substantially no heating of the cathode and the fact that this circuit exists during the "gas" check is without significance.

Upon the depression of switch 36, if an excessive amount of gas is not present in the tube envelope, the meter M1 will tend to remain in its noted position for a finite period, which is normally in the order of one to two seconds, and then will slowly and at a relatively rectilinear rate descend toward its zero point. Conversely, if an excessive amount of ionizable medium is present in the envelope of the tube under test, the needle of the meter M1 will tend quickly to depart its noted position, and relatively rapidly descend toward its zero position at a noticeably non-rectilinear rate. Further, if the switch 36 is then released so that it is restored to the position shown in Fig. 2 of the drawings, if the device under test is not "gassy" the needle of the meter M1 will restore quite rapidly to the before-noted position, whereas, if an excessive amount of ionizable medium exists in the tube envelope, the needle of the meter M1 will tend to return to the above-noted position relatively slowly.

The foregoing test has been found accurately to anticipate whether the device being tested will or will not stand up if returned to service. The functioning of the apparatus during this test can be explained as follows: Upon the initial depression of switch 36, the filament is de-energized and the cathode of the device under test begins to cool. If the envelope is properly evacuated, the cathode continues to emit an adequate supply of electrons for a short period, in the order of one or two seconds, to maintain adequate current through the tube to hold the meter M1 substantially in its fully deflected position. As the cathode further cools, the electrons emitted therefrom are reduced in quantity, producing an approximately constant-speed decline in the position of the needle of the meter M1. Conversely, when the switch 36 is released to re-energize the filament, the cathode again begins to heat, causing a relatively steady increase in the quantity of electrons emitted therefrom. However, if an ionizable medium is present in the envelope of a degree sufficient to impair the proper operation of the device in use, it is believed that this medium tends to establish a barrier impeding the progress of the electrons. Upon the de-energization of the filament and the commencement of cooling of the cathode of the device under test, this barrier becomes increasingly effective to prevent the flow of current through the device, and consequently the needle of the meter M1 falls at a rapid rate, and at a rate which is perceptibly non-rectilinear. Conversley, when the filament is re-energized by the release of the switch 36, the cathode must attain a reasonably highly heated condition before the electrons emitted therefrom can adequately pierce the barrier, and consequently the rise of the needle of the meter M1 is relatively slow. It is further believed that the performance of the above-described test actually produces an indication of the amount of secondary emission in the device which is salutary in that it is the secondary emission of a "gassy" tube which causes it improperly to operate.

The above-described renewing operation is not adapted to repair an open filament, and, in general, it has been found that the repair of open filaments is a difficult and not highly successful operation. However, means are provided on the disclosed instrument for attempting to repair an open filament. The selector switch 30 is placed in its No. 1 position, the filament switch is placed in its No. 1 position, the function switch 28 is placed in its No. 3 position, and the filament weld switch 38 is momentarily operated. As a result, a circuit is completed from the positive direct voltage on conductor 70, No. 3 contact and wiper 100 of function switch 28, conductor 102, No. 2 contact of the momentarily operated switch 38, conductor 66, through the filament of the device under test, and to the negative return lead 56. As a result, some 300 to 350 volts is momentarily applied across the filament of the device under test tending to produce a welding arc across the open section in the filament. In a percentage of cases it has been found that this serves to weld the two sections of the filament together. Whether the operation has been successful may be ascertained by again performing the filament continuity test previously described, i. e. with all other switches in the positions in which they were placed preparatory to the welding operation, but with the filament weld switch 38 released, the filament continuity switch 36 is depressed and the condition of the neon diode D1 is viewed.

While it will be apparent that the embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. The method of renewing the condition of a cathode-ray tube having a cathode and a grid which comprises applying an alternating voltage having an amplitude greater than 250 volts directly between the cathode and grid.

2. The method of renewing the condition of a cathode-ray tube having a cathode and a grid which comprises applying an alternating voltage having an amplitude between 300 and 900 volts directly between the cathode and grid.

3. The method of renewing the condition of a cathode-ray tube having a cathode, a grid and another electrode which comprises applying a voltage between the other electrode and the cathode, and applying an alternating voltage having an amplitude greater than 250 volts between the cathode and grid.

4. The method of renewing the condition of a cathode-ray tube having a cathode, a filament and a grid which comprises applying a voltage normal for the device to the filament, momentarily applying an alternating voltage having an amplitude greater than 300 volts between the cathode and grid, applying a voltage abnormally high for the device to the filament, and momentarily applying an alternating voltage between the cathode and grid.

5. The method of renewing the condition of a cathode-ray tube having a cathode, a filament, a grid and two other electrodes which comprises applying a voltage normal for the device to the filament applying a direct voltage between both of the other electrodes and the cathode, and applying an alternating voltage having an amplitude greater than 300 volts between the cathode and grid.

6. The method of renewing the condition of a cathode-ray tube having a cathode, a grid and another electrode which comprises applying a voltage having an amplitude greater than 200 volts between the other electrode and cathode, and applying an alternating voltage having an amplitude between 300 and 900 volts between the cathode and grid.

7. In a device for renewing the condition of a cathode-ray tube having a filament, a cathode, a grid, and another electrode, means for applying a voltage normal for the tube to said filament, means for applying a direct voltage between said other electrode and said cathode, and means for applying an alternating voltage having an amplitude greater than 300 volts between said cathode and said grid.

8. In a device for renewing the condition of a cathode-ray tube having a filament, a cathode, a grid and another electrode, a source of filament voltage normal for said filament, a source of filament voltage abnormally high for said filament, means for selectively connecting said sources to said filament, a source of direct voltage, means for connecting said source of direct voltage between said other electrode and said cathode, a source of alternating voltage having an amplitude greater than the amplitude of the voltages supplied from either of said sources of filament voltage, and means for connecting said source of alternating voltage between said cathode and said grid.

9. In a device for renewing the condition of a cathode-ray tube having a cathode and a grid, a low-impedance source of alternating voltage having an amplitude greater than 200 volts, and low-impedance means for connecting said source directly between said cathode and said grid.

10. In a device for renewing the condition of a cathode-ray tube having a cathode electrode and a grid electrode, a transformer having a primary winding connectable to a voltage source and a secondary winding having two output terminals, conductive means for connecting one of said electrodes directly to one of said terminals, and conductive means including a switch capable of being operated momentarily for connecting the other of said electrodes directly to the other of said terminals.

11. In a device for renewing the condition of a cathode-ray tube having a filament, a cathode electrode and a grid electrode, a source of filament voltage normal for said filament, a source of filament voltage abnormally high for said filament, switch means for selectively connecting said sources to said filament, a transformer having a primary winding connectable to a voltage source and a secondary winding having two output terminals, means for connecting one of said electrodes to one of said terminals, and means including a switch capable of being operated momentarily for connecting the other of said electrodes to the other of said terminals.

12. In a device for renewing the condition of a cathode-ray tube having a cathode electrode, a grid electrode and another control element, a transformer having a primary winding connectable to a voltage source and a secondary winding having three output terminals, means for connecting one of said electrodes to one of said terminals, means including a switch capable of being operated momentarily for connecting the other of said electrodes to a second of said terminals, a rectifying device, a capacitor, means serially connecting said device and said capacitor between the third one of said terminals and one of the other ones of said terminals, and means connecting said other control element to the point of junction of said rectifying device and said capacitor.

References Cited in the file of this patent

UNITED STATES PATENTS

| | | |
|---|---|---|
| 1,881,645 | Jones et al. | Oct. 11, 1932 |
| 2,371,327 | Hendry | Mar. 13, 1945 |
| 2,413,707 | Helliar | Jan. 7, 1947 |